UNITED STATES PATENT OFFICE.

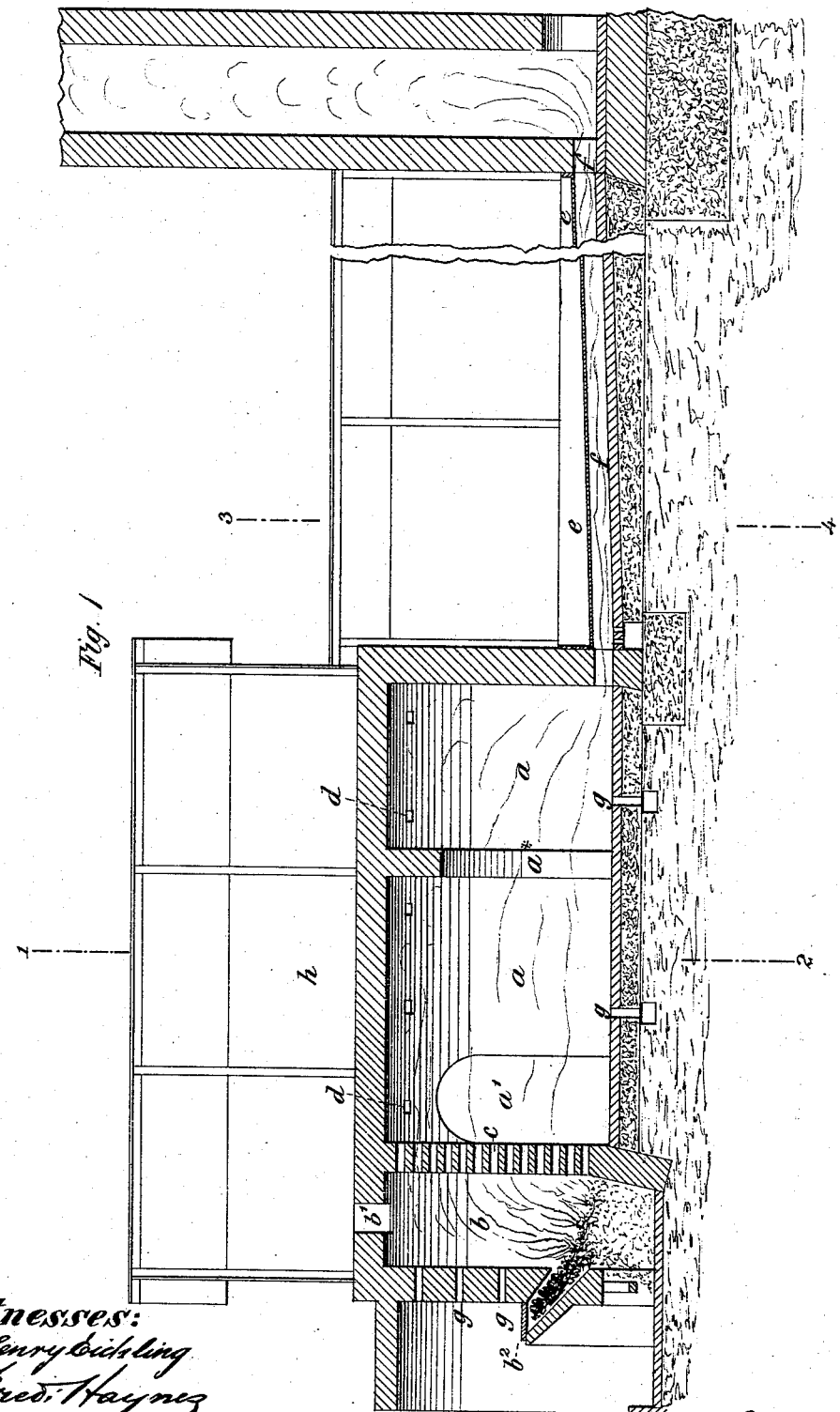

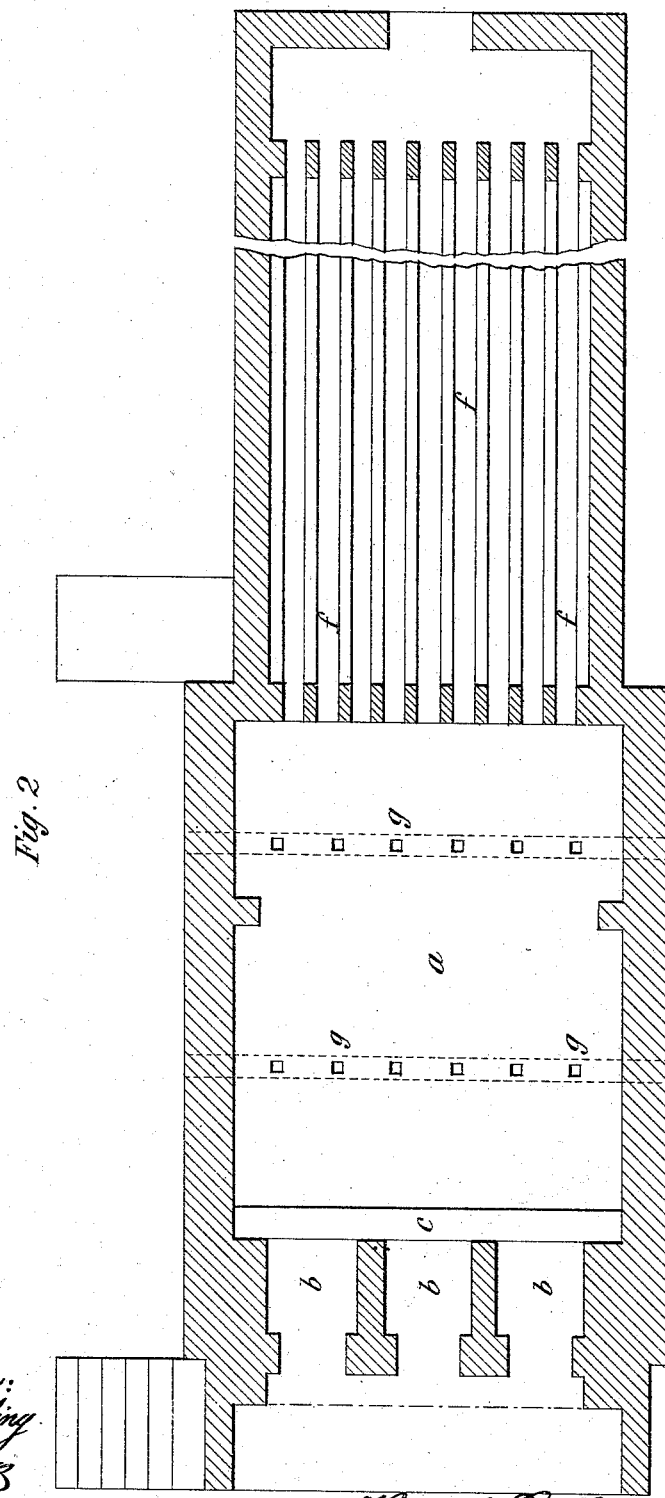

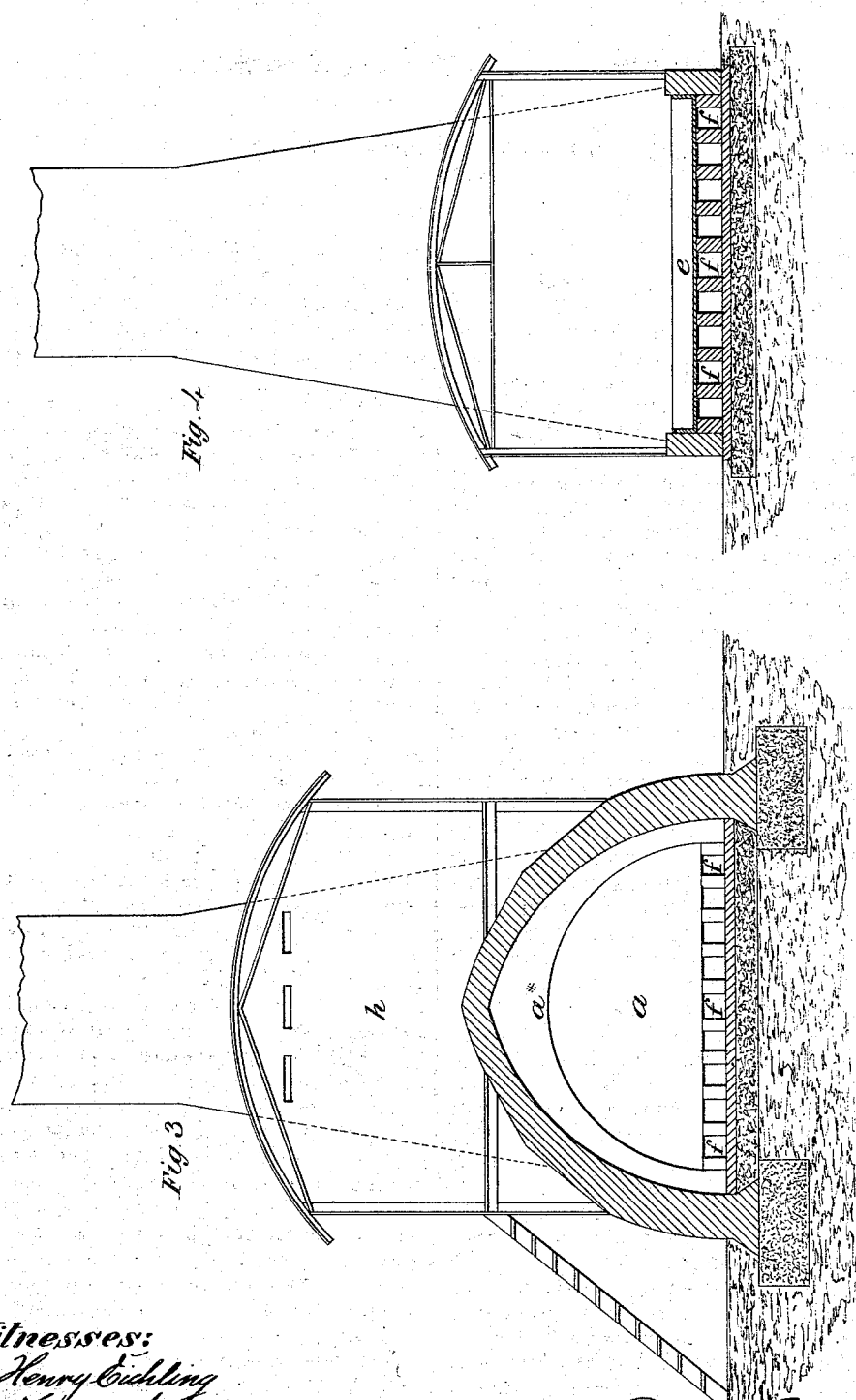

HENRY Y. D. SCOTT, OF EALING, ENGLAND.

IMPROVEMENT IN TREATING SEWAGE.

Specification forming part of Letters Patent No. 154,093, dated August 11, 1874; application filed April 6, 1874.

*To all whom it may concern:*

Be it known that I, HENRY YOUNG DARRACOTT SCOTT, of Ealing, in the county of Middlesex, England, major-general, C. B., have invented certain improvements in the treatment of sewage for the purpose of obtaining therefrom useful products, such as manure and cement, of which the following is a specification:

It is well known that liquid sewage cannot, without great inconvenience, be used in its normal state for irrigating land, in consequence of the disagreeable effluvia that are given off from the land. To remedy this it has been proposed to purify the sewage-water by precipitating from it, by means of lime and other chemical agents, the suspended matters contained therein, together with the soluble impurities, so that the clear liquid may be allowed to run into a stream or river. It was supposed that by this process a large proportion of the fertilizing properties contained in the sewage would be thrown down in the precipitated solid matters, which would therefore be useful as manure. This, however, was found to be erroneous, and, upon analysis and experiment, it was proved that the precipitated solid matters were nearly valueless as a manure; and, therefore, no one could be induced to be at the expense of even carting them away from the depositing-tanks. The consequence is an accumulation of a great mass of solid matter, which soon becomes an intolerable nuisance. Moreover, as the whole of the lime used in the precipitating process was rendered valueless, the quantity employed was, as a measure of economy, reduced to so small a proportion as to be practically useless. This mode of dealing with sewage was, therefore, found to be beset with difficulties which were well nigh insuperable.

The object of the present invention is to reduce the cost of the purification of liquid sewage by precipitating the solid mineral and organic matters, and then producing from such precipitate, by means of calcination, marketable substances, such as cement and manure.

In order to effect the precipitation of the chemical matters contained in the sewage, I add from sixteen to thirty-two grains of quicklime (more or less) to every gallon of sewage-water in any of the modes usually practiced. The amount of lime to be used will depend upon the richness of the sewage in those matters which will form, with lime, insoluble compounds, such as carbonate or phosphate of lime.

The precipitated solid matters, when obtained, are collected and dried on hot plates or slip-kilns, as is practiced in the manufacture of Portland cement; or they may be dried in any other convenient way. If preferred, the solid matters may be partially dried and made into the form of perforated bricks, in which condition they can be kept for an indefinite period without giving off any disagreeable odor, and the completion of the drying can then be allowed to take place slowly. I then expel from the solid matter the carbonic-acid gas (which is precipitated in combination with the lime) by calcining the solid matter in heaps or in a kiln or oven, which, together with a drying-floor, may conveniently be constructed in the manner shown in the accompanying drawing.

Figure 1 is a longitudinal vertical section of the kiln. Fig. 2 is a horizontal section or sectional plan view of the same. Fig. 3 is a transverse vertical section taken in the line 1 2 of Fig. 1, and Fig. 4 is a similar view taken in the line 3 4 of Fig. 1.

$a\ a$ is the compartment in which the cakes, bricks, or lumps of the dried precipitate are placed for the purpose of being calcined. It is provided with a doorway or opening, $a'$, Fig. 1, which, when the kiln is charged, is bricked up. $b\ b$ is the fire-place, which is used to commence the firing, and which is fed through the opening $b^1$ above or through the mouth $b^2$. The fire-place $b$ is separated from the calcining-compartment by a perforated wall, $c$, constructed in fire-brick, or it may be built up with the material to be calcined. The calcining-chamber $a$ is constructed, as shown in Fig. 3, in the form of a pointed arch, and is provided with an arch, $a^*$, for the purpose of causing the heat to descend and act on the substances to be calcined. Openings $d\ d\ d$ are also made in the sides or upper part of the chamber for the escape of steam, or to admit air to support combustion, for which latter purpose the inlets $g\ g\ g$ in the end wall and floor of the chamber also serve. The heated gases and flame from the fire-place $b$ will pass through the perforated wall $c$ and act on the solid matters in the chamber $a$, and as these matters contain a very large amount of combustible organic matter they will quickly ignite and burn, thereby so far contributing to the calcination of the lime and clay contained in the solid precipitate.

The space above the ignited fuel in the fire-place may, therefore, be filled up with the dried precipitate, which may be thrown in through the opening $b^1$ above. The fire-place must then be closed, or nearly so, in order to prevent the access of too much air. The heated gases evolved from the calcining substance will pass along the hollow floor or flues $ff$, beneath the shallow vessel $e\ e$, in which the wet slip is placed for the purpose of being dried. When the gases have parted with their heat, they will pass into and ultimately escape up the chimney. The shallow vessel $e$ for drying the slip may be covered with a galvanized-iron roof, as shown at Figs. 1 and 4, and above the calcining-compartment $a$ another drying-chamber for completing the drying of the solid precipitate may be constructed, as shown at $h\ h$, Figs. 1 and 3.

The precipitate, when properly calcined, will consist of quicklime, phosphate of lime, and other foreign ingredients; and I either pulverize this and employ it for mortar for building purposes, or I use it for a manure, in which latter case it has the advantage over ordinary quicklime that it contains a larger percentage of phosphoric acid. When the sewage-water is comparatively free from suspended clay, I sometimes make use of the calcined precipitate for the precipitation of a fresh portion of sewage-water, and in this case I obtain a compound comparatively rich in phosphoric acid, by means of a subsiding process, which is practiced as follows:

After the calcined precipitate has been slaked in the ordinary way, I make a milk of lime, from which, if necessary, the coarser silicious compounds may be separated by a process of decantation. The milk of lime is then mixed with more water, and, after stirring the liquid, I allow the matters remaining undissolved to subside, and then run off the top water, (charged with lime in solution,) in order to precipitate the sewage. Owing to the small extent to which lime is soluble, I must employ a large quantity of water, which, however, I obtain by pumping back the clarified effluent sewage-water. It is also necessary to make use of three or more stirring-vessels for this process, so as to have the operations of stirring, settling, and decantation continuous. By this means the phosphates can be more effectually separated from lime than when the milk of lime (which carries with it to the precipitating-tanks a considerable amount of phosphate) is allowed to run into the sewer without settling.

In lieu of these subsiding processes, I sometimes add the whole of the calcined precipitate first obtained to the second portion of sewage-water to be operated upon, without extracting the phosphate of lime from it; and by repeating this operation again and again, I at last obtain a lime compound sufficiently rich in phosphoric acid to constitute it a valuable manure. For the purpose of preparing manure on the above system, I prefer, for obvious reasons, to precipitate with lime containing phosphoric acid.

The above-described process and results refer to sewage of normal character; but owing to local circumstances and special manufactures, (the washings from which find their way into the sewers,) the nature of the sewage sometimes undergoes considerable modifications. In some places considerable quantities of sulphate of iron and sulphuric acid are discharged into the drains, and the precipitate produced by lime may consist, chiefly, of oxide of iron mixed with organic matter, which latter is destroyed by the subsequent calcination to which my process subjects it, and anhydrous oxide of iron mixed with silicious and calcareous matter (valuable for gas-purification and other purposes, as well as for a pozzuolanic cement,) is obtained. I prefer to mix with the precipitate, before calcination, some quicklime slaked to a fine powder, or to use gas-lime as it comes from the gas-works, as the precipitant; or I may use a mixture of lime and chalk to produce similar results.

My invention has the advantage of admitting of the use, in connection with the lime, of other precipitating and disinfecting materials, such as salts of iron or alumina, or soluble, or partially soluble, sulphates, or clay, for the purpose of more efficient purification, or the production of a marketable article of greater value. For instance, by the addition of one part, by weight, of clay to every two or three parts (more or less) of lime present, the resulting precipitate will yield, after calcination, a hydraulic cement. I would remark that the best results are obtained when the silex in the calcined material amounts to one-fifth, or thereabout, of the whole. As some variation occurs, both in the quantity of silex present in the sewage-water, and of lime in the clay used, attention must be paid to these circumstances in proportioning the ingredients.

By the addition of oxide of iron, sulphate of iron, sulphate of alumina, or chloride of iron, I can prepare a cement which shall have approximately the composition and action of Medina, Roman, or Mulgrave cement, these cements varying in the proportion of iron and alumina they contain. The iron and alumina salts will, at the same time, more perfectly disinfect and precipitate the flocculent matters suspended in the sewage-water. With a view of improving the quality of the cement, I sometimes add two or two and a half per cent. of sulphate of lime in a finely-divided condition, or a small percentage of sulphuric acid, or some soluble sulphate, to the precipitated sewage while in the wet condition, and at the same time, if desired, small quantities of salts soda or of potash may be introduced in order to increase its rapidity of "set."

Portland cement may be obtained by the addition of the proper proportion of clay, as compared with the lime present or obtained in the precipitate, and by the employment of a higher temperature than when a tender-burnt cement is aimed at. Portland cement, as is well known, contains from twenty-two to twenty-four per cent. of silex, and ten to fourteen per cent. of iron and alumina, and is usually made of about sixty-five per cent. of lime and thirty-five per cent. of clay; but, as all sewage contains these ingredients in varying proportions, the proportions of lime and clay to be added to the sewage matters (when Portland cement is to be produced) must, of course, vary. It will, therefore, be necessary to ascertain by analysis the quantities of clay and lime contained in the sewage, and then regulate the addition of further quantities of these substances accordingly.

In lieu of the quicklime of commerce, gas-lime or other lime refuse may be employed for the precipitation of the sewage, and the preparation of the above calcareous marketable compounds. The best mode of proceeding in this case depends upon the nature of the refuse lime. If very rich in hyposulphites, (as is frequently the case with gas-lime partially oxidized,) the operation is commenced by washing out the soluble salts. The residue is calcined in a heap, oven, or kiln, and employed, when slaked, for the purposes of precipitation. When the refuse lime is not rich in hyposulphites it is calcined and used for the precipitation of the sewage without a previous washing process. With the view of more thorough mixture and agitation of the chemicals employed with the sewage-water, the chemicals should, by preference, be added at points of the sewer distant from the outfall, whereby expensive mixing and agitating machinery is rendered unnecessary, and the sewers are themselves purified. With the view of increasing the quantity of cement produced, when the organic matter in the sewage is abundant or fuel very cheap, I sometimes add to the sewage, besides the lime and clay necessary for its precipitation, such a quantity of chalk and clay, in the proportions ordinarily used in the manufacture of Portland cement, as can be economically dealt with, both in respect of labor and fuel.

By modifying the conditions under which the calcination is carried out—as, for instance, by employing external heat, excluding the air, and keeping the temperature so low as not to produce lime by the mutual decomposition of the carbonate of lime and carbonaceous matter of the deposit—I produce charcoal useful as a means of purifying the effluent sewage-water from the lime process by filtration. The matters distilled in this operation may be collected by well-known means, and be made available for various purposes.

Having now described my invention, I wish to be understood that I claim—

The combination of the process of precipitating the solid and organic matters contained in sewage with the process of calcining the precipitate, so as to obtain useful and marketable products therefrom, as herein set forth.

London, December 31, 1873.

HENRY Y. D. SCOTT.

Witnesses:
H. K. WHITE,
A. S. BISHOP,
66 *Chancery Lane, London.*